June 21, 1949.　　　O. FREGEOLLE　　　2,473,944

SELECTING MECHANISM

Filed Dec. 8, 1945　　　　　　　　　　8 Sheets-Sheet 1

FIG.1.

INVENTOR:
OSCAR FREGEOLLE,
BY
ATT'Y.

June 21, 1949. O. FREGEOLLE 2,473,944
SELECTING MECHANISM
Filed Dec. 8, 1945 8 Sheets-Sheet 2

INVENTOR:
OSCAR FREGEOLLE,
BY
ATT'Y.

June 21, 1949. O. FREGEOLLE 2,473,944
SELECTING MECHANISM
Filed Dec. 8, 1945 8 Sheets-Sheet 3

FIG. 6.

INVENTOR:
OSCAR FREGEOLLE,
BY
ATT'Y.

June 21, 1949.  O. FREGEOLLE  2,473,944
SELECTING MECHANISM
Filed Dec. 8, 1945  8 Sheets-Sheet 4

FIG. 7.

INVENTOR:
OSCAR FREGEOLLE,
BY
ATT'Y.

June 21, 1949.   O. FREGEOLLE   2,473,944
SELECTING MECHANISM
Filed Dec. 8, 1945   8 Sheets-Sheet 6

INVENTOR:
OSCAR FREGEOLLE,
ATT'Y.

June 21, 1949.　　　　O. FREGEOLLE　　　　2,473,944
SELECTING MECHANISM

Filed Dec. 8, 1945　　　　　　　　　　8 Sheets-Sheet 7

INVENTOR:
OSCAR FREGEOLLE,
BY [signature]
ATT'Y.

June 21, 1949.　　　O. FREGEOLLE　　　2,473,944
SELECTING MECHANISM
Filed Dec. 8, 1945　　　　　　　　　　　8 Sheets-Sheet 8

INVENTOR:
OSCAR FREGEOLLE,
BY [signature]
ATT'Y.

Patented June 21, 1949

2,473,944

UNITED STATES PATENT OFFICE 2,473,944

SELECTING MECHANISM

Oscar Fregeolle, Central Falls, R. I., assignor to Hemphill Company, Central Falls, R. I., a corporation of Massachusetts Application December 8, 1945, Serial No. 633,654

12 Claims. (Cl. 66—43)

1

This invention relates to a new and useful improvement in mechanisms for producing patterns in hoisery and other articles knitted on circular, independent needle, knitting machines by the method in which the needles which are to knit the patterning yarns are selected by being raised above the others or by the equivalent method in which selection is accomplished by lowering the needles leaving the selected needles in position to receive the patterning yarn or yarns. The device was conceived and developed for use on a circular, independent needle, knitting machine of the Banner type and, in consequence, this particular design is shown and described herein but it will be understood that there is no intention of limiting the invention to this design or to use on this type of machine.

This invention is particularly valuable for work in which dual needle selection is required since it permits of the introduction and removal of both selecting devices in a needle space only slightly larger than the width of one. This makes it possible to extend closely spaced over-all patterns all the way around the stocking and eliminates the relatively large space, positioned usually at the back of the stocking, which heretofore could not be patterned. The invention also permits of the operation of any or any combination of the dual selectors wholly independently of the others through the agency of a single pattern drum so that maximum flexibility is obtained by a minimum of parts.

2

Figure 1:
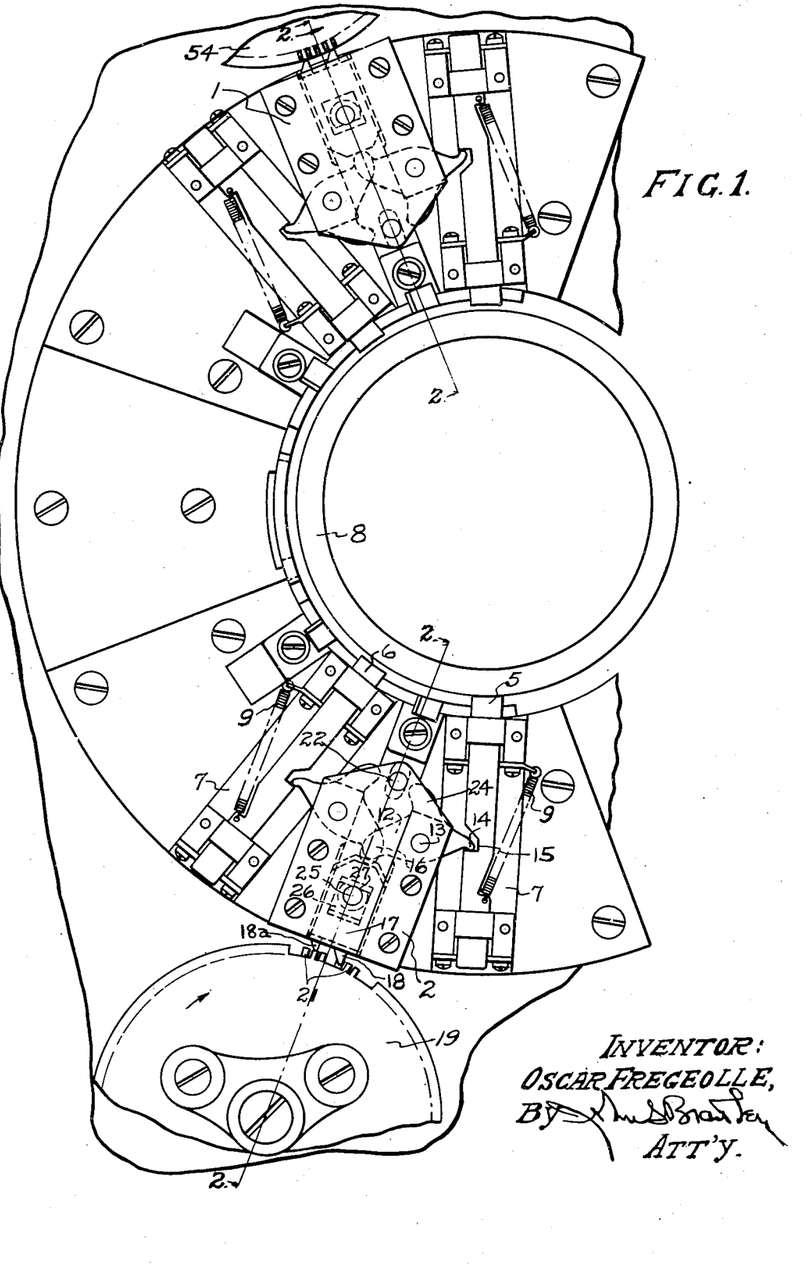
Fig. 1 is a plan view of a part of a knitting machine of the Banner type for both rotary and reciprocatory split knitting showing the needle cylinder and two sets of selecting mechanisms each having two banks of selectors and also showing a pattern drum for each set.
Figures 2, 3, 4, 5:
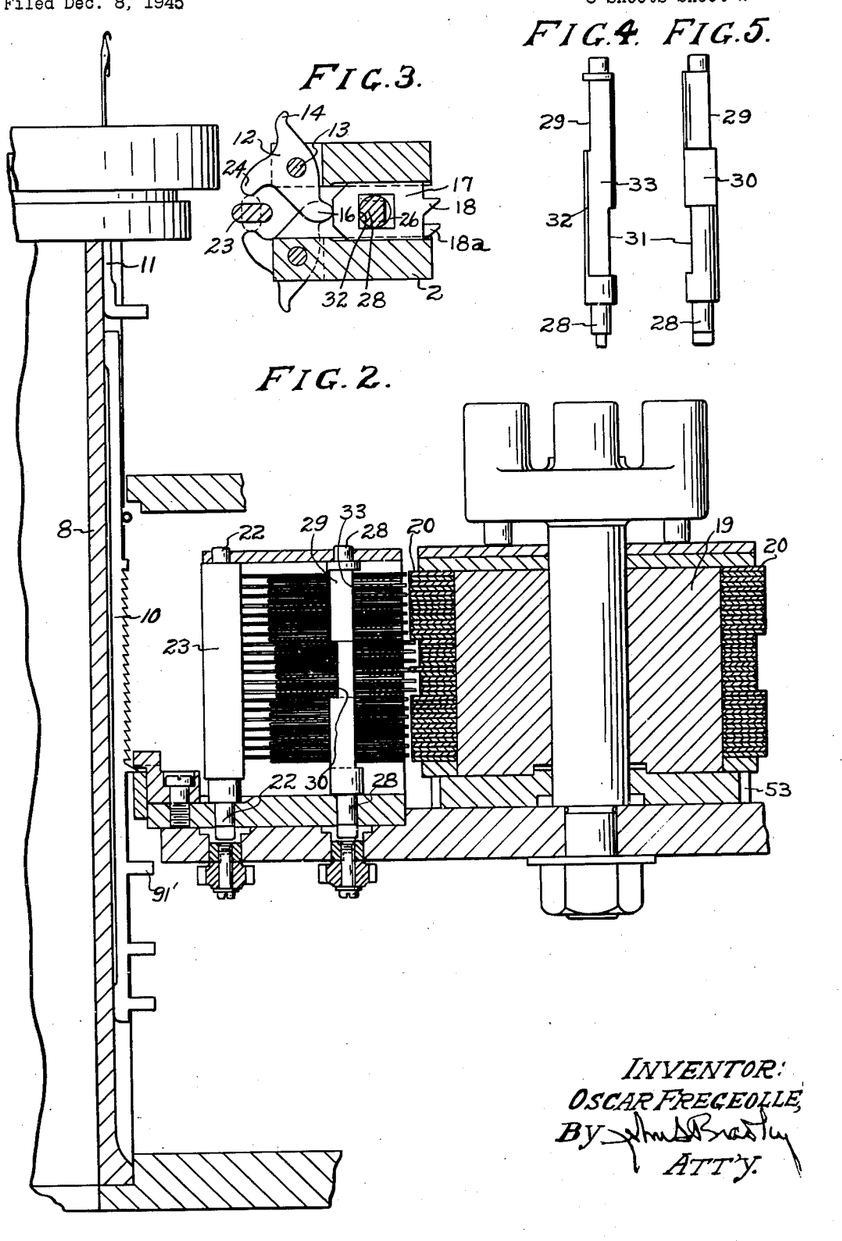
Fig. 2 is an elevation partly in section on the line 2—2 of Fig. 1 viewed as indicated by the arrows and also showing the cylinder with a jack and needle.
Fig. 3 is a plan view of two of the means whereby individual selectors are operated from the pattern drum.
Figs. 4 and 5 are views of the device whereby certain groups of selectors may be held out of operation irrespective of the pattern drum discs.

Figs. 1 and 2 illustrate parts of a circular, independent needle knitting machine of the Banner type equipped with selecting mechanism of this invention for selecting needles for the purpose for making over-all or any other desired wrap patterns of one or a plurality of colors by rotary or reciprocatory knitting. This consists of a selecting unit 1 for selecting needles during counter-clockwise rotary knitting and a selecting unit 2 for similar selecting needles during clockwise knitting. These selecting mechanisms are alike so that this description will be limited to an explanation of selecting mechanism 2.

Figure 7:
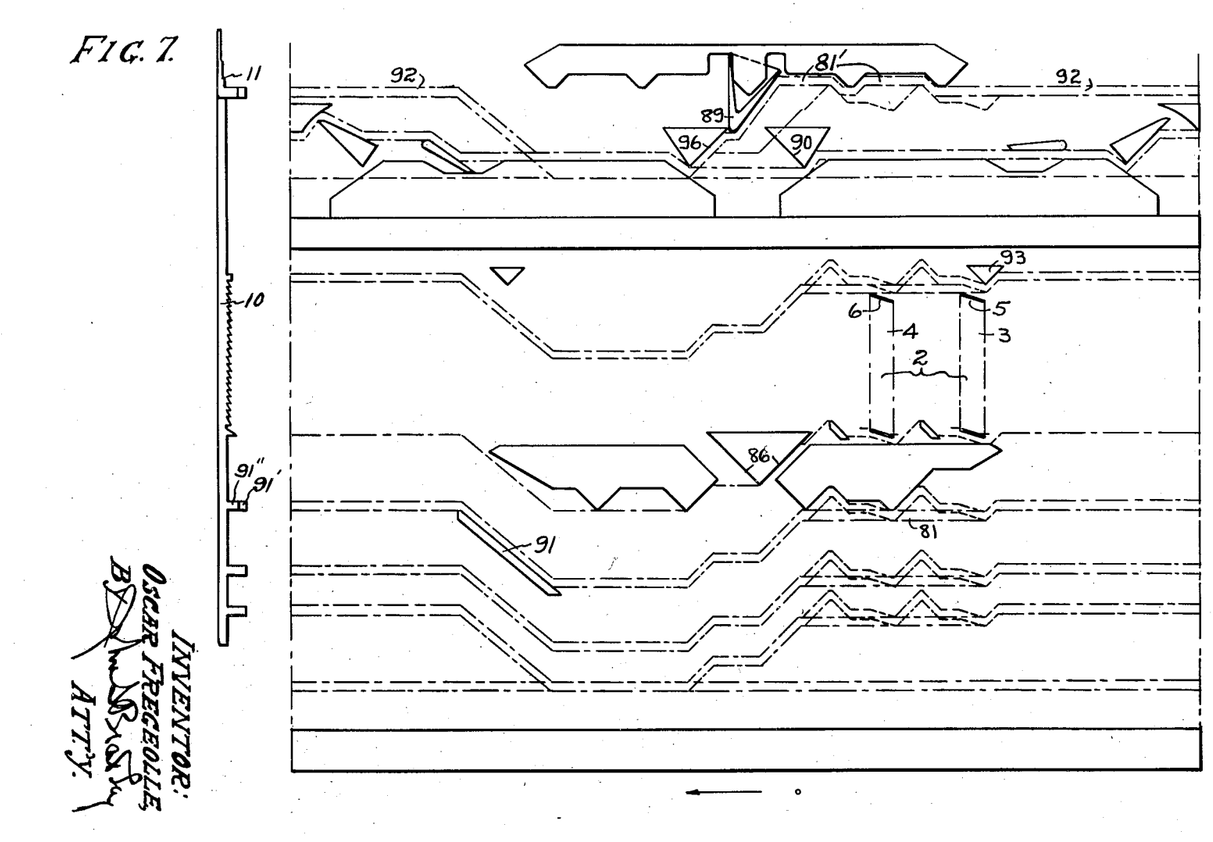
Fig. 7 is a view similar to that of Fig. 6 in relation to clockwise knitting.
Figure 8:
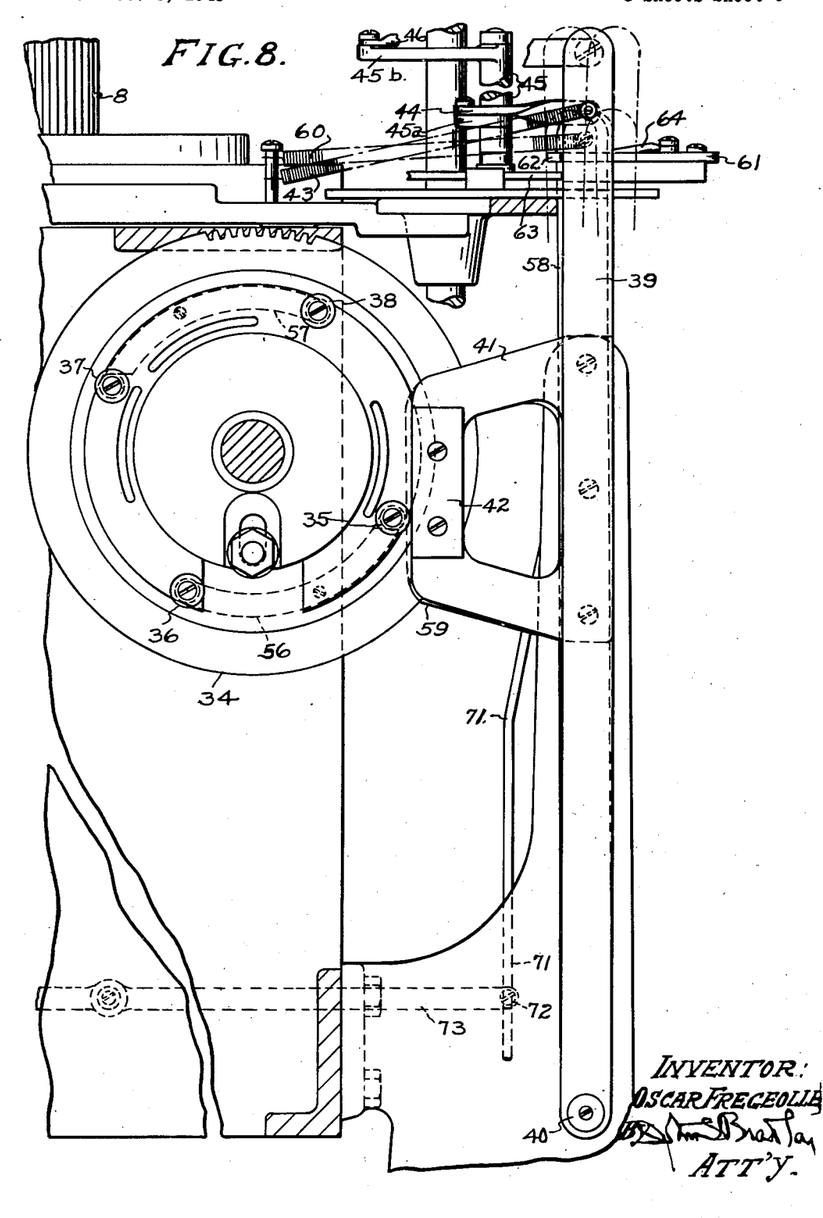
Fig. 8 is a side elevation of a part of the mechanism for operating the pattern drum.
Figure 9:
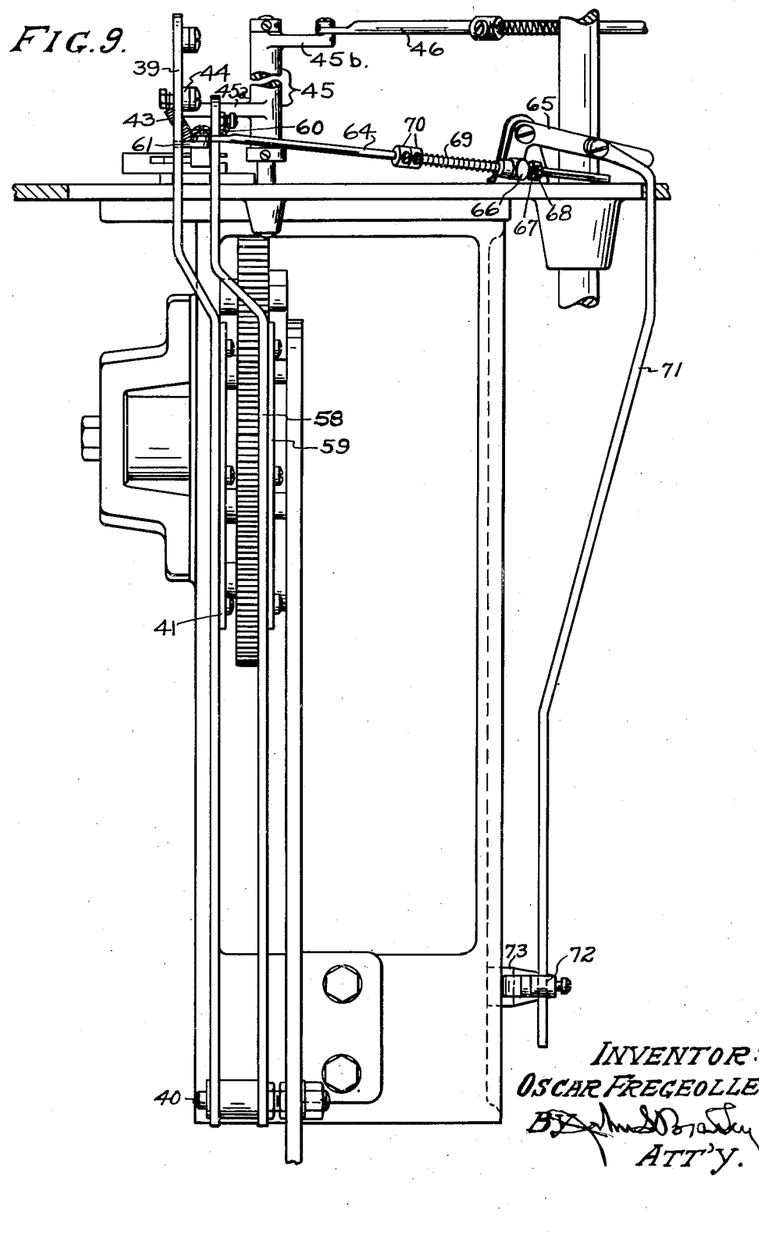
Fig. 9 is a rear elevation of the mechanism of Fig. 8.
Figure 10:
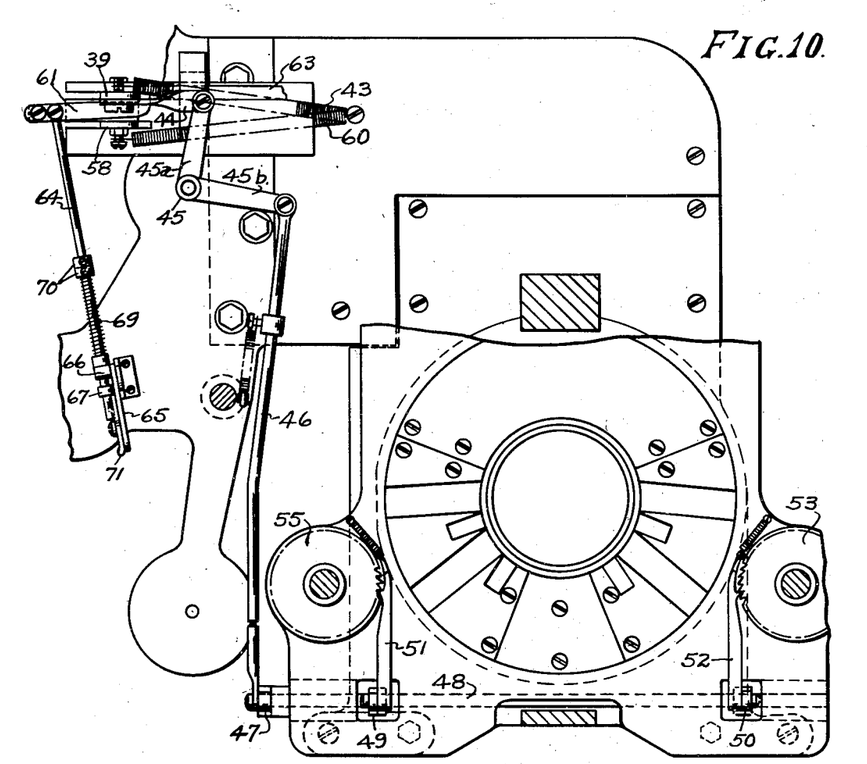
Fig. 10 is a plan view showing other parts of the same mechanism.
Figure 11:
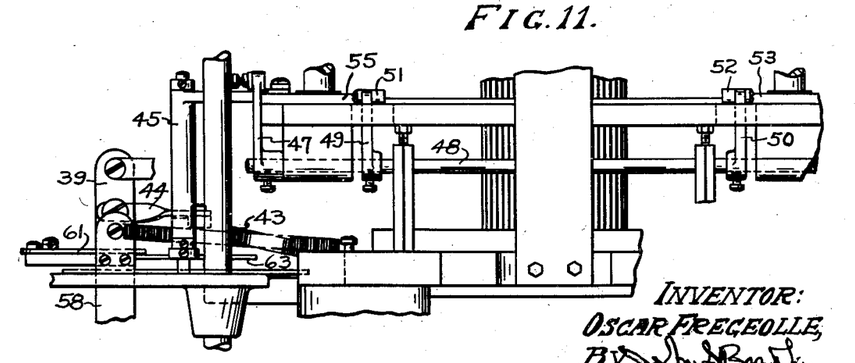
Fig. 11 is an elevation also illustrating parts of the same mechanism.

This mechanism consists of two vertical banks of parallel selector blades conventionally indicated at 3 and 4 in Fig. 7 and of the general nature of those shown in U. S. Patent #2,217,022. The top blade of each set is shown at 5 and 6, respectively, in Fig. 1. Each of the selector blades is mounted in a frame 7 so that it is slidable radially toward and away from the needle cylinder 8 and is normally urged toward the needle cylinder by a spring 9. The needles are selected by means of jacks preferably of the type having frangible saw tooth butts described and claimed in McNaughton Patent #2,058,481, one of which is shown at 10 in Figs. 2 and 7 below the needle 11. Blades 3 are so arranged that, when any one of them is moved into operating position, it will operate upon a particular butt of the jacks, provided this butt has not been broken out. Selector blades 4 are arranged so as to operate in a similar manner.

Each selector blade of each set has its individual operating mechanism whereby it can be moved into and out of operation independently of any other blades of its own or its associated set. The operating mechanism for selector blade 5 which is typical of all of them of set 3 consists of a rocker 12 pivoted as at 13 so as to swing in a horizontal plane and provided with an arm 14 which engages with a notch 15 in blade 5. A second arm 16 is engageable with a lever 17 slidable radially of the needle cylinder, the outer end of which terminates in a projection 18. Each of the selector blades of the other set 4 is associated with a similar operating mechanism with the exception that projection 18a which corresponds with projection 18 is offset laterally from projection 18 as shown in Fig. 1. These operating mechanisms for the two sets of blades 3 and 4 are alternately positioned one above the other.

There is also a pattern drum 19 which may be of the well known type provided with a series of ring shaped selecting discs 20 one above the other each having frangible butts 21 around its periphery. Pattern drum 19 is so positioned and the discs are so spaced and proportioned that butts 21 of alternate discs are aligned to engage with the corresponding projections 18 of levers 17 to push them in and through the agency of rockers 12 to draw the corresponding selector blades away from the cylinder and out of action. The intermediate discs of pattern drum 19 are similarly aligned with projections 18a of the intermediate lever 17 so that the corresponding selector blades can be drawn away from the cylinder in the same manner but at a different time corresponding to the lateral distance between projections 18 and 18a. When any projection 18 or 18a is not riding upon a butt 21 the corresponding lever is released and the particular selector blade associated therewith is urged toward the needle cylinder by its spring 9.

In this way by a suitable arrangement of butts 21 on the various discs 20 of pattern drum 19 each selector blade of each set can be independently moved out of operating position and released so as to be able to move into operating position through the action of a single pattern drum.

Heretofore pattern mechanisms of this general double selection type have differed from this invention in that, if a single pattern drum were used the selectors of both sets were operated by the same levers, a selector of one set being released first so as to move into operating position followed by the release of one of the second set through additional movement of the same lever. The disadvantage of this arrangement is that the selectors can only be withdrawn in the reverse order, the selector first released being pulled out first followed by the other selector. As a result, a needle space equal to the width of both selectors plus the distance between them and a little more had to be left without patterning, for example, the width of selectors 3 and 4 plus a little more than the space between them (Fig. 1). As already explained, this space is much greater than the usual space desired between the patterns in over-all patterning.

By the device of this invention each selector of one set can be released for operation and requires a needle space only slightly larger than the width of the selector itself and each selector of the other set can be released to move in into the same small space in the same or a later course. Similarly the selectors of each set can be individually removed from action so that the only needle space required for the operation of the selectors is the small space just mentioned. Since this space is ordinarily no greater than that between patterns, a completely symmetrical patterning around the entire stocking can be obtained or at worst a much narrower unpatterned area.

Means is also provided for simultaneously withdrawing all of the selector blades of sets 3 and 4 whenever patterning is discontinued. This consists of a rotatable shaft 22 having an elliptical body 23 vertically positioned so as to be engageable with a third arm 24 of rocker 12 to rock this arm in such a way that arm 14 will withdraw its selector blade 5 out of the zone of operation. The elliptical body 23 of shaft 22 is of sufficient length to act simultaneously in this way upon all of the rockers for all of the selector blades. Shaft 22 may be operated from any suitably timed mechanism so that the selecting mechanism is thrown into and out of action at the desired times.

Another device for the same purpose is also shown in Fig. 1. This consists of a rotatable vertical shaft 25 passing through an opening 26 in each lever 17. One side of this otherwise cylindrical shaft is flat as shown at 27 and the shaft is so positioned that when flat 27 faces the rockers of which 12 is one, the selector blades of the two sets 3 and 4 will be released so that they can move into operating position under the control of the pattern drum 19 as heretofore described. When shaft 25 is turned to bring the round part opposite the rockers levers 17 are pushed inward to operate the rockers so that the selector blades are all simultaneously withdrawn from action.

Either one of these devices is all that is necessary for repeated patterns but for patterns having different parts of different character, such as the head, stem and fork of a clock, it is necessary to have some means for automatically throwing out of action the different groups of selector blades used in making the different parts. A device for this purpose is shown in Fig. 3 and in modified form in Figs. 2, 4 and 5.

The form shown in Fig. 3 is the same as the form shown in Figs. 2, 4 and 5 with one exception which will be explained. It consists of a shaft 28 provided with a plurality of depressed flats. Assuming that the seven upper selectors of the two sets which have been described are used for selecting the needles for making the head of a clock, shaft 28 is provided with a flat 29 which, when it faces the rockers, will release the seven upper selector blades of each set 3 or 4 which will be urged into operating position by their springs. The rest of this side of shaft 28 below flat 29 is cylindrical and holds the remaining selectors in withdrawn position. Another side of shaft 28, shown at right angles to the side just mentioned, has a depressed flat 30 which coincides vertically with the levers which control the six selector blades of each set below the first seven just mentioned. It is assumed that these are used to select the needles for making the stem of the clock. When flat 30 faces rockers these selector blades are released so that they can move into operating position under the control of the pattern drum. Below flat 30 and on another face of shaft 28, shown as the face opposite to that having flat 29, is another depressed flat 31 positioned so as to operate similarly upon the lower group of levers to similarly release the corresponding selector blades for selecting the needles to make the fork of the clock. The remaining face of shaft 28 may be cylindrical as shown at 32 in Fig. 3 and, if so, will operate to withdraw all of the selector blades out of operation but preferably it takes the form of a fourth flat 33 extending the full length of the levers so that by turning shaft 28 so that this flat faces the rockers 12 all of the selector blades are released for operation as determined by the pattern drum.

If this latter form is used, the device illustrated by shaft 22 having the elliptical body 23 must also be used to provide a means for automatically withdrawing all of the selector blades from operation whenever patterning is discontinued. The rotation of shaft 28 is, of course, mechanically controlled from any suitable source so that it can be turned, as above described, to each of its operating positions at the desired times.

Figure 6:
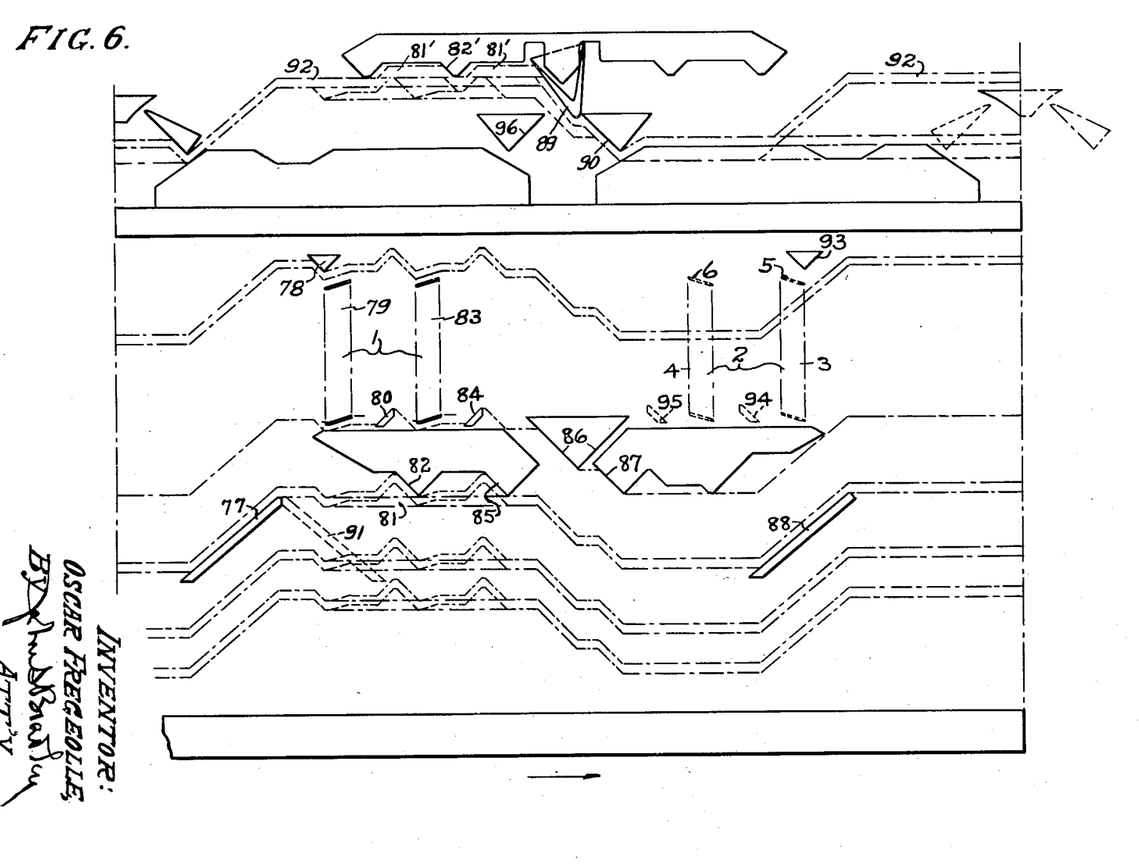
Fig. 6 is a schematic view of the needle, jack and selector cams and the paths followed by the needles and jacks during counter-clockwise knitting.

The selecting unit 1 which, as already stated, is for selecting needles during counter-clockwise knitting is the same as selecting unit 2 which has been described with the exceptions that the selector blades slope in the other direction, as clearly indicated in Fig. 6, to conform to the different direction of knitting and the corresponding difference in the timing of its operation is provided for. Therefore, no detailed description of selecting unit 1 is necessary.

Whenever it is desired to use one set of selector blades without the other, as in ordinary one color wrapping, this can be easily done by leaving all of the butts of alternate pattern wheel discs intact, the pattern being set up on the butts of the other discs. This will keep one set of selectors out of action without affecting the operation of the other set in accordance with the pattern.

A mechanism for operating the two pattern drums each of which controls one of the two selecting mechanisms 1 and 2 is shown in Figs. 8 to 15. This mechanism is operated from the 104-gear 34 upon the side of which are four equally spaced rollers 35—38. A hatchet 39 is pivotally attached to the frame of the machine as at 40 so that it can rock back and forth in a vertical plane. An extension 41 of hatchet 39 projects toward the 104-gear and is provided with a plate 42 which can move into the path of rollers 35—38. Normally hatchet 39 is urged towards the rollers (to the left in Fig. 8) by a spring 43. Since the 104-gear rotates once for every four revolutions of the needle cylinder, hatchet 39 will be rocked away from the 104-gear (to the right in Fig. 8) each time a roller 35—38 engages plate 42 or once for every revolution of the needle cylinder.

Adjacent the upper end of hatchet 39 is pivotally attached a link 44 (Figs. 8, 9 and 10) connected to arm 45a of a bell crank 45 the other arm 45b of which connects with a rod 46 which runs to a crank 47 (Figs. 10 and 11) rigidly affixed to shaft 48. Two cranks 49 and 50 are also affixed to shaft 48 and carry on their upper ends pivoted pawls 51 and 52. Drum 19 is provided with a ratchet wheel 53 (Figs. 2 and 10) through which the drum is driven by means of pawl 52. Similarly, the other pattern drum 54 (Fig. 1) is provided with a ratchet wheel 55 (Fig. 10) through which the drum is driven by pawl 51. The ratchet teeth of ratchet wheels 53 and 55 are identical but oppositely directed so that pawls 51 and 52 can turn ratchet wheels 53 and 55 and, consequently, drums 19 and 54 simultaneously and through the same angular distance in opposite directions. Each time hatchet 39 is rocked to the right by a roller 35—38, the two pattern drums will be rotated to the extent of one or two ratchet teeth as the case may be. Thus there is provided a means for rotating the pattern drum once for each revolution of the needle cylinder during rotary knitting.

The operating mechanism just described is not suitable for controlling the pattern drums during reciprocatory knitting for the reason that the 104-gear makes a complete revolution for each two courses of knitting instead of one revolution for each four courses as in rotary knitting. This being so, if the mechanism described above were used, hatchet 39 would cause the pattern drums to be kicked around four times during each two course cycle of reciprocatory knitting instead of twice. Because of this the control of hatchet 39 is taken away from rollers 35—38 at two equally spaced intervals during one rotation of the 104-gear. On the opposite side of the 104-gear from that on which rollers 35—38 are positioned are two arcuate cams 56 and 57 which bridge the space corresponding to that between rollers 35 and 36 and rollers 37 and 38, respectively. A second hatchet 58 mounted on the same pivot 40 as hatchet 39 rocks in a plane parallel to that of hatchet 39. Hatchet 58 is provided with an extension 59 similar to extension 41 of hatchet 39 positioned so as to be engageable by cams 56 and 57. Therefore, hatchet 58 which is normally urged towards the 104-gear by a spring 60 will be rocked away from the gear by cam 56 and held away for one fourth of a revolution and will again be similarly rocked away from the gear and held away by cam 57 for the one fourth of a revolution opposed to that first mentioned. Therefore, two equally timed and equally spaced rocking movements are imparted to hatchet 58 during each revolution of the 104-gear 34. Stating it another way, one rocking movement is imparted to hatchet 58 for each direction of rotation of the needle cylinder.

Figures 12, 14, 16, 17:
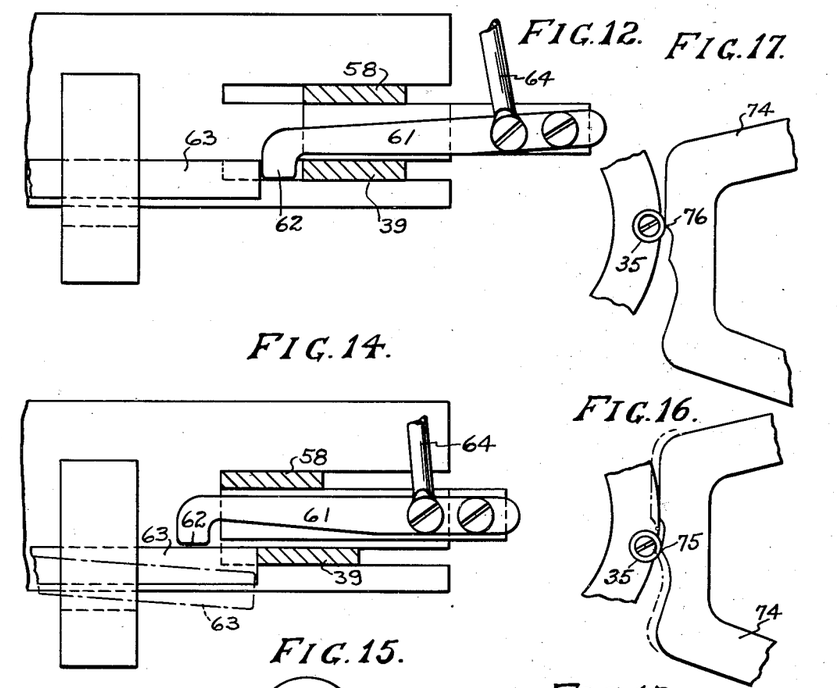
Figs. 12 to 15 are illustrative sketches of certain parts.
Figs. 16 and 17 are views illustrating a modification.
Figures 13, 15:
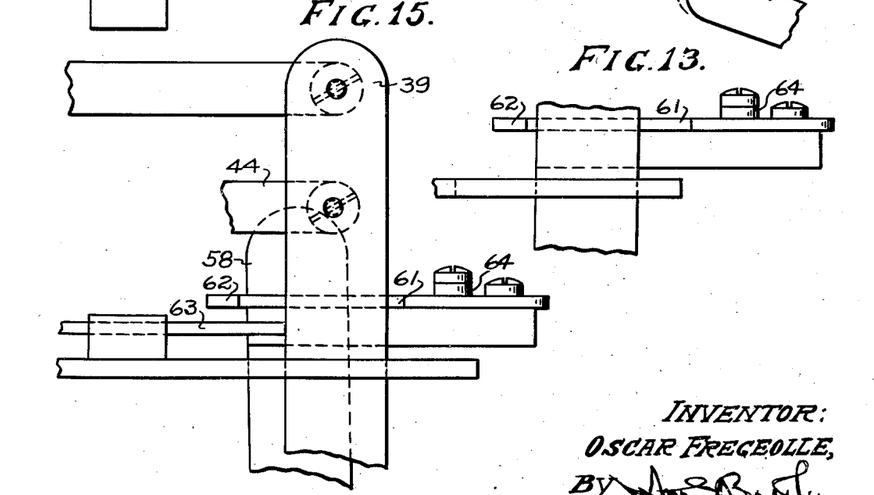

Hatchet 58 is not connected to the pattern drums 19 and 54. Instead it is used to control the operation of hatchet 39 by altering its normal operation to conform to that of hatchet 58. To do this, hatchet 58 is provided with a latch 61, the end 62 of which encircles hatchet 39. Therefore, as shown in Fig. 12, the timing of the rocking of hatchet 39 is taken away from rollers 35—38 and transferred to cams 56 and 57. In other words, hatchet 39 is made to follow the movement of hatchet 58 so that it will rock twice per revolution of the 104-gear instead of four times. In consequence, the pattern drums 19 and 54 will receive but one rotary kick from pawls 51 and 52 for each direction of rotation. Whenever latch 61 is disengaged from hatchet 39 each hatchet will operate independently as directed by rollers 35—38 and cams 56 and 57 as above described. Under this condition, hatchet 58 moves idly and takes no part in the operation or control of the pattern drums.

The movement of hatchet 58 is always equal to that required for a two tooth movement of the pattern drums. Hatchet 39 is arranged so that its movement can be limited to a one tooth rotation or extended to a two tooth rotation. Its movement is limited to that required for a one tooth rotation by a stop 63 against which hatchet 39 strikes during its inward movement and by which this movement is limited to the required degree. When stop 63 is moved so that hatchet 39 will not engage it as indicated in dotted line in Fig. 14, the inward swing of hatchet 39 is sufficient to result in a two tooth movement of the pattern drums. When hatchet 39 is operating to produce a one tooth movement hatchet 58 can nevertheless move through its two tooth swing irrespective of whether latch 61 is in its operative or its inoperative position since the latch is able to leave hatchet 39 and follow the full inward movement of hatchet 58.

Mechanism is provided for automatically operating latch 61. As shown in Figs. 9-14 this consists of a rod 64 extending from latch 61 to one end of a bell crank 65 where it passes through a pivoted collar 66. Beyond collar 66 rod 64 is surrounded by a collar 67 which can be fixed on rod 64 by a set screw 68. Collars 66 and 67 are normally held together by a spring 69 the tension of which can be regulated by collar 70. Therefore, the connection of rod 64 to bell crank 65 is positive in one direction (the unlatching direction of latch 61) and resilient in the opposite or latching direction. The resilient connection is provided so that the mechanism for moving latch 61 into operation can be set in motion ahead of time and the latch permitted to snap into operating position when the proper point is reached. Bell crank 65 is rocked by a rod 71 pivotally attached as at 72 to a pivoted lever 73 which connects directly or through other linkage with any suitable operating source (not shown) such as a cam wheel.

By the mechanism described, any of the blades of the two banks of selecting blades of unit 1 which is used for rotary counter-clockwise knitting can be operated individually in successive courses and can be inserted and withdrawn in a needle space but little larger than the width of one of the blades. Also any of the blades of either of the two banks can be used alone. Selecting unit 2 performs the same function during clockwise knitting.

During reciprocatory knitting, although both pattern drums 19 and 54 are turned in unison, the two selecting units work in alternation, unit 1 for counter-clockwise knitting and unit 2 for clockwise knitting. This is readily accomplished by a suitable arrangement of the pattern upon each drum 19 and 54 so that one unit is idle while the other is operating.

Reference has been made to one and two tooth kicks of the ratchet wheel and corresponding rotations of the pattern drums to differentiate between a movement of a certain length and one twice as long. For certain purposes it may be desirable to double the normal number of teeth upon each ratchet and to provide for kicks of two and four teeth respectively instead of one and two. The reference to one and two teeth is meant to include any variation therefrom such as that just mentioned in which there are two degrees of rotation of the pattern drum, one twice as great as the other.

A desirable modification of the device described above consists of doubling the number of ratchet teeth and also the number of butts 21 on the rings of the pattern drums so that there is still one butt for each ratchet tooth and modifying hatchet 39 by substituting plate 74 shown in Figs. 16 and 17 for plate 41. The normal length of stroke of hatchet 39 remains unchanged with the result that each normal stroke will produce a two tooth rotation of the pattern drum.

A hatchet provided with plate 74 is not only capable of causing the selecting mechanism to carry out all of the kinds of work of which the form first described is capable it also makes it possible to utilize both banks of selectors of a single selecting unit to make two selections in the same course. It will be seen that plate 74 is provided with two lifts 75 and 76. The height of lift 75 is such that it will produce through the pawls 51 and 52 a one tooth rotation of the pattern drums. Lift 76 is of such a height that it will cause a further one tooth rotation of the pattern drums. Therefore, a single stroke of the pawls will result in a two tooth rotation of the pattern drums consisting of two parts each equal to one tooth and spaced apart in time by the distance between lift 75 and 76 as shown in Figs. 16 and 17 respectively. By properly spacing these lifts and arranging the butts on the pattern discs of the pattern drum which, as already stated, correspond in number to the teeth of the ratchet, it becomes possible to insert a selector blade of one bank of selectors, withdraw it and insert a selector blade of the other bank of selectors of the same unit during the same course of knitting and in the same needle space as that required for the insertion of the selector blade of the first bank. This needle space, as previously explained, need be only a little wider than the width of a selector blade.

It will now be obvious to those skilled in the art that this modification can be used during reciprocatory knitting quite as well as for rotary knitting. In fact, since the modification just described includes and extends the capabilities of the form of the invention first described, it is suggested that the modified form might well be preferred for all types of work for which the device is suited.

Although it is not limited thereto, one of the advantages of this invention is that it permits of raising the needles for two selections to the same height. Ordinarily double selections have necessitated the raising of needles to two different heights. For example, in color-within-color work the "within-color" needles have been raised to a greater height so that the "within-color" yarn can be kept out of the "color" needles. By this invention the "color" needles are raised by, say, a selector blade of bank 3 and are immediately lowered before the color-within-color needles are raised to the same height by a selector blade of bank 4. In consequence, the "color" yarn is behind the color-within-color needles and is not cast off over their latches. Therefore, the float of "color" yarn is not stretched and made tighter so that the quality of the wrap is not affected. Furthermore, the raising of both the color and color-within-color needles to the same height makes it possible to use two identical jack cams for needle selection instead of cams of different heights and also a wrap spindle having all of the yarn feeding eyelets at one level instead of at two thus simplifying the manufacture of the parts and the assembly of the machine.

A desirable jack and needle cam arrangement which may be used in conjunction with the selecting mechanism heretofore described and which is much simpler than the usual arrangement is shown in Figs. 6 and 7. It requires the employment of a jack under each needle, such, for example, as jack 10 in Fig. 7 and the jack should have a long butt 91′ which is capable of being broken off to form a short butt 91″. With reference to rotary counter-clockwise knitting a jack cam 77 is positioned ahead of selecting unit 1 which cam is retractable and adapted to engage both long butts 91' and short butts 91" to raise all of the needles to the elevation 92. This elevation may be the maximum required for any part of the knitting with the exception of wrapping, for example, the height assumed by the long butt needles to permit them to pass over the main cam block during the knitting of the heel and toe. Under these conditions all of the needles will knit at the auxiliary side of the machine under knitting cam 90. It will be noted that once the needles are raised to height 92 they go straight through to the knitting cams without further manipulation.

By retracting cam 77 sufficiently so that it will not engage short butts 91", only the needles associated with jacks having long butts 91' will be raised as above described. Ordinarily these will be the needles of the long butt group which knit at the auxiliary side. The needles associated with the short butt jacks will not be raised and will pass under auxiliary knitting cam 90 without knitting.

After cam 77 has caused all or part of the needles to be raised to the height 92 as above described the jacks are immediately lowered by cam 78 to the height at which they can be selected the selector blades of bank 79 of selecting unit 1 in case wrapping is to be done. As will be seen from Fig. 6, the needles remain at height 92 so that jack selection is accomplished without affecting the position of the needles in any way. Any jacks which are selected by one or more of the blades of bank 79 will pass up selecting cam 80 and will elevate the corresponding needles to wrapping level 81'. The jacks concerned are immediately lowered again to selecting level by cam 82 after which, if a further selection is to be made, jacks are again selected by the selector blades of the other bank 83 of unit 1 in the same manner as before and corresponding needles are raised by the selected jacks to wrapping level 81' by jack cam 84 after which the jacks are brought down by cam 85.

The jacks not concerned with selection pass under the selector blades 79 and 83 and under cams 80 and 84 and they are brought down by cams 86 and 87 to the low level while the needles are knitting at the auxiliary knitting cam block. The jacks stay at a low level until they engage cam 77 again during the next course of knitting to raise the needles again as above described.

The cam arrangement for reciprocatory knitting is similar with the exception that the needles are raised at the end of a stroke to position them for knitting the next course in the opposite direction instead of during the course in which they knit. This is shown in Fig. 7. Cam 77 is drawn back completely out of operation and cam 88 substituted therefor. Cab 88 is moved into operation during the last course of rotary knitting so that it will raise the needles to level 92 to position them for the first clockwise stroke of reciprocatory knitting. Thereafter the jacks and needles follow the paths shown in Fig. 7 which are substantially the same as those already described with the exception that they are in the opposite direction, until cam 91 is reached whereby they are again elevated through the jacks to level 92 to position them for knitting in counter-clockwise direction. Cams 88 and 91 are retractable and are moved out of action in alternation so that cam 88 functions only during counter-clockwise strokes and cam 91 only during clockwise strokes.

By initially raising all of the needles which are to knit at the auxiliary cam block to the high level 92 several needle and jack cams which would otherwise be necessary are eliminated. Also the needles are isolated from the jack selecting operation so that wear upon the needles, jacks and cams is reduced and the operation made simpler and more certain.

It will be noted that by this arrangement all wrapping whether single or multiple is done at the same level. Heretofore multiple wrapping has necessitated the raising of needles to be wrapped to two different heights. For example, in color-within-color work, the "within color" needles have been raised to a greater height so that the "within color" yarn can be kept out of the "color" needles. By this invention the "color" needles are raised to wrapping level and are immediately lowered before the "within-color" needles are raised to the same height to receive the color-within-color yarn. In consequence, the "color" yarn is behind the "within-color" needles and is not cast off over their latches. Therefore, the "color" wrap is not tightened by the stretching of the float of the "color" yarn so that the quality of the wrap is improved. Furthermore, jack cams 80 and 84 and 94 and 95 can be identical with the exception that the two cams last mentioned slope in the opposite direction, of course. In addition, a wrap spindle can be used which has all of its yarn feeding eyelets or fingers at single level instead of two which simplifies the manufacture and assembly of the parts and produces identical conditions for both color and color-within-color wrapping. It will be understood, of course, that the advantages of the arrangement described in connection with color-within-color work extend to any work in which double selection in the same or different courses is required.

A further advantage obtained by the above arrangement is that since, before selection, the needles have already been raised to the high level 92 as heretofore described, the needles selected for wrapping need be raised only a very short distance above this level to gain the wrapping level 81' both for ordinary wrapping or color-within-color or other wrapping involving multiple selection. This makes it possible to use very short selecting cams such as 80 and 84 and to position them in the comparatively small spaces available in the actual and operating sense. Because wrapping level 81' can thus be considerably higher than usual the carrier ring can be so constructed that its upper edge is below the hooks of the selected needles. Therefore, it will be unnecessary to recess the carrier ring in the customary way to provide space for the passage of the eyelets or fingers of an eccentric wrap spindle outside of the needle circle since the spindle can be so positioned that the eyelets or fingers will work above the carrier ring. Furthermore, the unbroken carrier ring may serve as a latch guard for all of the needles insuring that the latches will be kept open until they approach the knitting point. Also, if so-called concentric wrap mechanism is used, the yarn trapper associated therewith may be positioned above the carrier ring so that it can be made a fixture and need not be moved in or out at any time. This eliminates all of the mechanism heretofore required for operating the trapper.

I claim:

1. In a circular, independent needle, knitting machine having main and auxiliary cam blocks, needles adapted to knit at said auxiliary cam block and a jack under each needle, the combination of a jack cam for raising all of said needles through their associated jacks directly to the maximum level required for knitting at the auxiliary cam block, means for lowering said jacks to a predetermined level without affecting the position of said needles, means for raising preselected ones of the jacks above the others without causing the preselected jacks to engage the needles, means for raising corresponding needles through said preselected jacks to a wrapping level above said previously mentioned level and means for lowering said jacks to the level of the remaining jacks.

2. A selecting mechanism which consists of two vertical banks of needle selecting blades, said banks being spaced apart and each being adapted to be positioned close to and radially of the cylinder of a circular knitting machine, individual means for moving each of said blades away from said cylinder independently of the other and a single means for operating said individual means, means for imparting to said single means one complete movement per revolution of the cylinder or one complete movement per half reciprocation of the cylinder, each of said complete movements consisting of two partial movements spaced apart in time by the period required for a point on the cylinder to move from one bank of selecting blades to the other.

3. In a selector mechanism a unit including two adjacent banks of needle selector blades, a single pattern drum for operating the blades of both of said banks, ratchet means for turning said pattern drum and actuating means for imparting a complete movement to said drum, said complete movement consisting of two partial movements spaced apart in time by the period required for a point on the needle cylinder of a circular knitting machine to move from one of said banks of selector blades to the other.

4. A needle selecting mechanism for a circular, independent needle, knitting machine which consists of two vertical, spaced banks of needle selecting blades adapted to be positioned close to the cylinder, individual means for moving each of said blades away from said cylinder independently of the others and a single means for operating said individual means, said single means being adapted to have imparted thereto one complete movement per revolution of the cylinder during rotary knitting and one complete movement per rotation of the cylinder in each direction of reciprocatory knitting and means for dividing each of said complete movements into two partial movements spaced apart in time by the period required for a point on the cylinder to move from one bank of selecting blades to the other.

5. In a circular, independent needle, knitting machine a pattern drum, ratchet means for turning said pattern drum and actuating means therefor which includes a rotatable member and two levers operable thereby the second of which is operably connected to said ratchet means, means on said rotatable member for actuating the first of said levers a given number of times per revolution of said member, means on said member for actuating the second of said levers a different number of times per revolution of said element, and means for causing the first of said levers to change the actuation of said second lever to conform to the actuation of said first lever whereby said pattern drum may be turned at different intervals of time.

6. In a circular, independent needle, knitting machine having a pattern drum and ratchet means for turning said drum, operating means for said ratchet means which includes a rotatable member and a lever operable thereby, means on said rotatable member for actuating said ratchet means through said lever at a given periodicity, another lever operative with respect to said rotatable member as a control for said first lever, means on said rotatable member for actuating said other lever at a different periodicity than that of said first mentioned lever and means for connecting said levers at predetermined times so that the actuation of said ratchet means conforms to the periodicity of the second lever.

7. In a circular, independent needle, knitting machine having a pattern drum and a ratchet for turning said drum, a swingable lever for operating said ratchet and a gear having spaced means on one side thereof to engage and swing said lever at a given periodicity, another lever operative with respect to said gear as a periodic control for said first lever, means on the other side of said gear for swinging said other lever at a different periodicity and a latch for connecting said levers whereby said first lever is operated through said other lever by the said means on the other side of said gear.

8. In a circular, independent needle, knitting machine having a pattern drum and ratchet means for turning said drum, actuating means therefor comprising rotatable means and two levers operable thereby, means on said rotatable means for actuating one of said levers a given number of times per revolution of said rotatable means, means on said rotatable means for actuating the other of said levers a different number of times per revolution of said rotatable means and means for causing one of said levers to assume control of the other lever so that said other lever is actuated thereby and in harmony therewith.

9. In a circular, independent needle, knitting machine having pattern drum and ratchet means for turning said drum, operating means for said ratchet which includes a lever operatively associated with said ratchet means a rotatable member having means for actuating said lever at a given periodicity, another lever, other means on said rotatable member for operating said last mentioned lever at a different periodicity and means for connecting together said levers at predetermined times so that said other lever operates said first lever at the periodicity of said other lever.

10. A needle selecting mechanism for a circular, independent needle, knitting machine which consists of means capable of selecting needles twice during each revolution of the cylinder as they approach a knitting cam under which they will knit which includes two spaced banks of selector blades, two corresponding banks of selector levers for operating said blades, a bank of selector sliders for operating each of said levers independently and a single pattern drum for operating each of said sliders independently of the others.

11. A needle selecting mechanism for a circular, independent needle, knitting machine, a selecting unit including two adjacent banks of selector blades, individual means for resiliently retaining each of said blades adjacent the cylinder, individual means for moving each of said blades away from said cylinder independent of the others and a single pattern drum for moving away from the cylinder any blades of either bank independently of the others.

12. A needle selecting mechanism for a circular, independent needle, knitting machine which consists of two adjacent banks of needle selecting blades, two banks of selector levers between said banks of blades, each lever being operatively connected to a different blade and having a portion in operating alignment with a similar portion of each of the other levers, a bank of sliders for operating said levers, each slider being operatively associated with a different one of said levers and a single pattern drum for actuating any of said selector blades independently of the others through the corresponding sliders and levers.

OSCAR FREGEOLLE.

REFERENCES CITED

The following references are of record in the file of this patent:

UNITED STATES PATENTS

| Number | Name | Date |
| --- | --- | --- |
| 1,969,853 | Page | Aug. 14, 1934 |
| 2,012,607 | Houseman | Aug. 27, 1935 |
| 2,208,308 | Lawson et al. | July 16, 1940 |
| 2,211,785 | Lawson et al. | Aug. 20, 1940 |
| 2,217,022 | Lawson et al. | Oct. 8, 1940 |
| 2,316,822 | Thurston et al. | Apr. 20, 1943 |